US011293552B2

(12) United States Patent
Schwendenmann

(10) Patent No.: US 11,293,552 B2
(45) Date of Patent: Apr. 5, 2022

(54) BRUSH SEAL WITH SHAPE MEMORY ALLOY

(71) Applicant: UNITED TECHNOLOGIES CORPORATION, Farmington, CT (US)

(72) Inventor: Andrew V. Schwendenmann, Hampden, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 146 days.

(21) Appl. No.: 16/734,062

(22) Filed: Jan. 3, 2020

(65) Prior Publication Data

US 2021/0207714 A1 Jul. 8, 2021

(51) Int. Cl.
*F16J 15/3288* (2016.01)
(52) U.S. Cl.
CPC ................ *F16J 15/3288* (2013.01)
(58) Field of Classification Search
CPC ....... F16J 15/00; F16J 15/3284; F16J 15/3288
USPC .......................................... 277/355
See application file for complete search history.

(56) References Cited

U.S. PATENT DOCUMENTS

| 6,392,915 B1* | 5/2002 | Anson .................... B82Y 10/00 |
| | | 365/106 |
| 7,549,841 B1* | 6/2009 | Marussich .............. F01D 11/12 |
| | | 415/173.3 |
| 7,976,026 B2 | 7/2011 | Verma et al. |
| 8,939,709 B2* | 1/2015 | Nanukuttan ............ F01D 11/22 |
| | | 415/14 |
| 9,528,384 B2* | 12/2016 | Zheng .................... F01D 11/001 |
| 2014/0361499 A1 | 12/2014 | Gupta et al. |

FOREIGN PATENT DOCUMENTS

| EP | 1914388 | 4/2008 |
| JP | 2003004145 | 1/2003 |
| WO | 20140137444 | 9/2014 |
| WO | 2015053935 | 4/2015 |

OTHER PUBLICATIONS

European Patent Office, European Search Report dated Jun. 1, 2021 in Application No. 20217848.9.

* cited by examiner

*Primary Examiner* — Nathan Cumar
(74) *Attorney, Agent, or Firm* — Snell & Wilmer L.L.P.

(57) ABSTRACT

A brush seal may comprise a bristle pack including at least one bristle made of a shape memory alloy. The bristle may be used in a sealing system. The brush seal may be disposed in a seal cavity. The brush seal may further comprise backing plate and a retention structure coupled to the bristle pack. The brush seal may be configured for passive clearance control during operation of a gas-turbine engine.

17 Claims, 7 Drawing Sheets

BRUSH SEAL WITH SHAPE MEMORY ALLOY

FIELD

The present disclosure relates to seal structures, and, more specifically, to a seal structure for a gas turbine engine.

BACKGROUND

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

The gas turbine engine may have various gas-flow streams that may be kept separate from one another by various components and/or seals. Brush seals may be employed in applications where the seal cavity, within which the brush seal is located, expands and contracts axially due to translation and/or thermal expansion of the components that define the seal cavity. Brush seals may also be employed in applications where there is a high pressure differential between the various gas-flow streams. However, in high pressure differential applications, typical brush seals lead to increased bristle blow-down, which may lead to increased bristle wear.

SUMMARY

A brush seal is disclosed herein. The brush seal may comprise a backing plate; a retention structure; and a bristle pack disposed between the backing plate and the retention structure, the bristle pack comprising a bristle including a shape memory alloy.

In various embodiments, the bristle may comprise a manufactured shape including a line and an arc. The bristle pack may further comprise a non-shape memory alloy portion coupled to the retention structure and the backing plate, wherein the line extends substantially 45 degrees to a tangency at a joint between the bristle and the non-shape memory alloy portion in an axial plane. The arc may be configured to interface with a radial sealing surface. The bristle may be configured to curl in response to an increase in temperature. The bristle may be configured to curl away from the backing plate and towards the retention structure. The bristle may be configured for passive clearance control. The bristle pack may comprise a plurality of the bristle.

A seal system is disclosed herein. The seal system may comprise: a seal cavity defined, at least partially, by a first radial surface and a second radial surface; and a brush seal disposed in the seal cavity, the brush seal comprising: a backing plate; a retention structure; and a bristle pack disposed between the backing plate and the retention structure, the bristle pack comprising a bristle including a shape memory alloy.

In various embodiments, the bristle is configured to form an interference fit with the first radial surface, the first radial surface including a sealing surface. The bristle may comprise a sealing end disposed proximate the first radial surface, the sealing end configured to curl away from the first radial surface when the bristle increases in temperature. The seal cavity may be disposed in a gas-turbine engine, and the bristle pack may be configured for passive clearance control during operation of the gas-turbine engine. The bristle may comprise a manufactured shape including a line and an arc. The arc may contact the first radial surface. A sealing end of the bristle may be configured to curl away from the first radial surface.

A method of manufacturing a brush seal is disclosed herein. The method may comprise: fixing a plurality of bristles in a manufactured shape, each bristle in the plurality of bristles comprising a shape memory alloy; setting the manufactured shape of the shape memory alloy, the manufactured shape including a line and an arc; and coupling the plurality of bristles to a backing plate and a retention structure.

In various embodiments, setting the parent shape may comprise heating the shape memory alloy to a temperature greater than 400° C. Setting the parent shape may further comprise rapid cooling the shape memory alloy after heating the shape memory alloy. Coupling the plurality of bristles may further comprise orienting the arc away from the backing plate.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
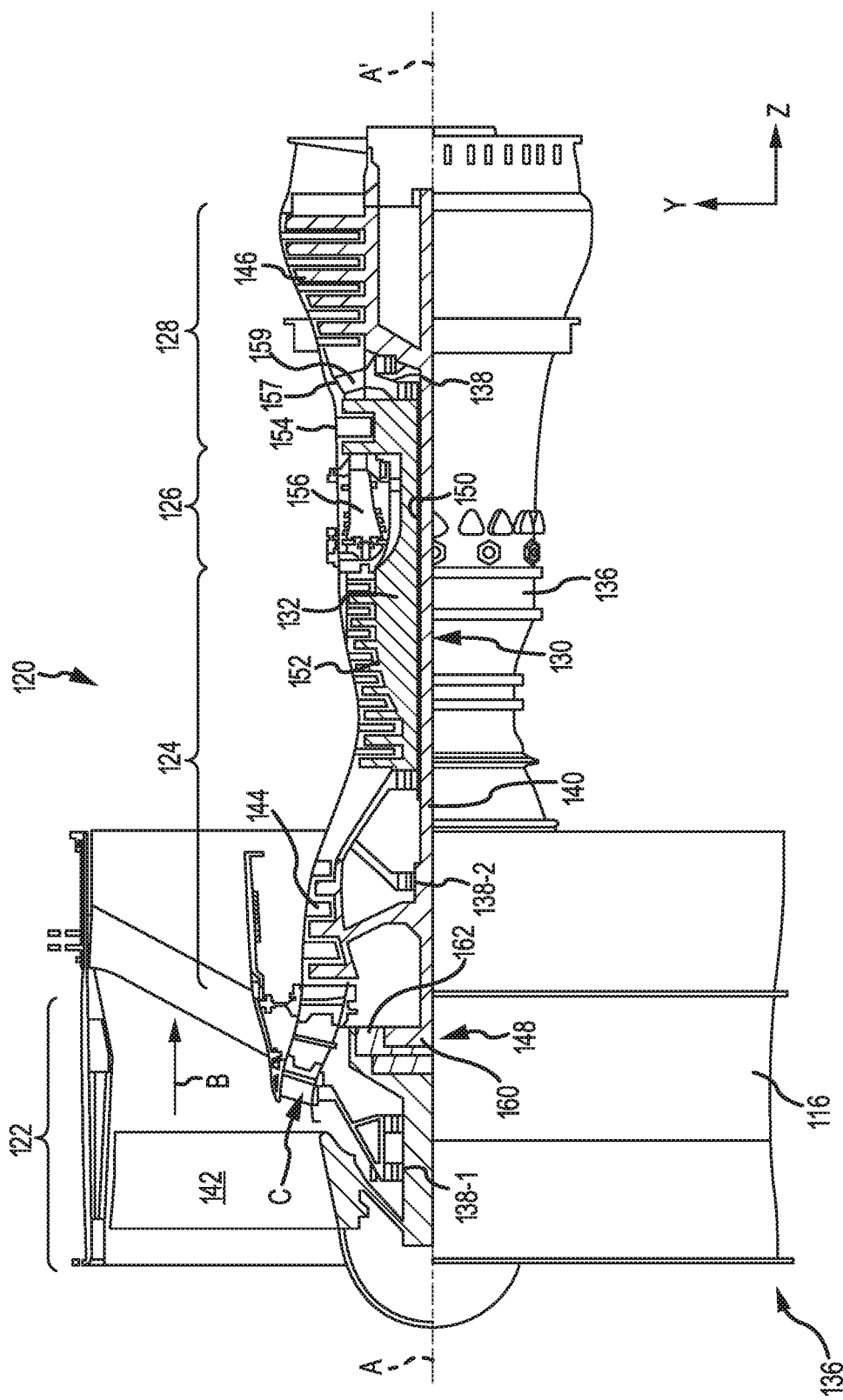
FIG. 1 illustrates an exemplary gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "distal" refers to the direction outward, or generally, away from a reference component. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Seal system as disclosed herein may comprise a brush seal located between a static structure and a rotating structure (e.g., a vane assembly and a blade assembly). The brush seal may comprise a backing plate and a first bristle pack. The backing plate is coupled to the first bristle pack. The bristle pack comprises shape memory alloys. The brush seal may be disposed in a seal cavity defined, at least partially, by a first radial surface and a second radial surface that is disposed radially outward from the first radial surface. The first bristle pack is configured to have a passive clearance control. For example, as the first bristle pack increases in temperature, each bristle in the first bristle pack may go through a phase transformation from martensite to austenite whereby they plastically deform into a parent shape and/or curl away from the second radial surface. In this regard, the first bristle pack may experience a decrease in wear and/or an increase in seal performance.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, such as turbojets, turboshafts, and three spool (plus fan) turbofans wherein an intermediate spool includes an intermediate pressure compressor ("LPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or first) compressor section ("LPC") 144, and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by LPC 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
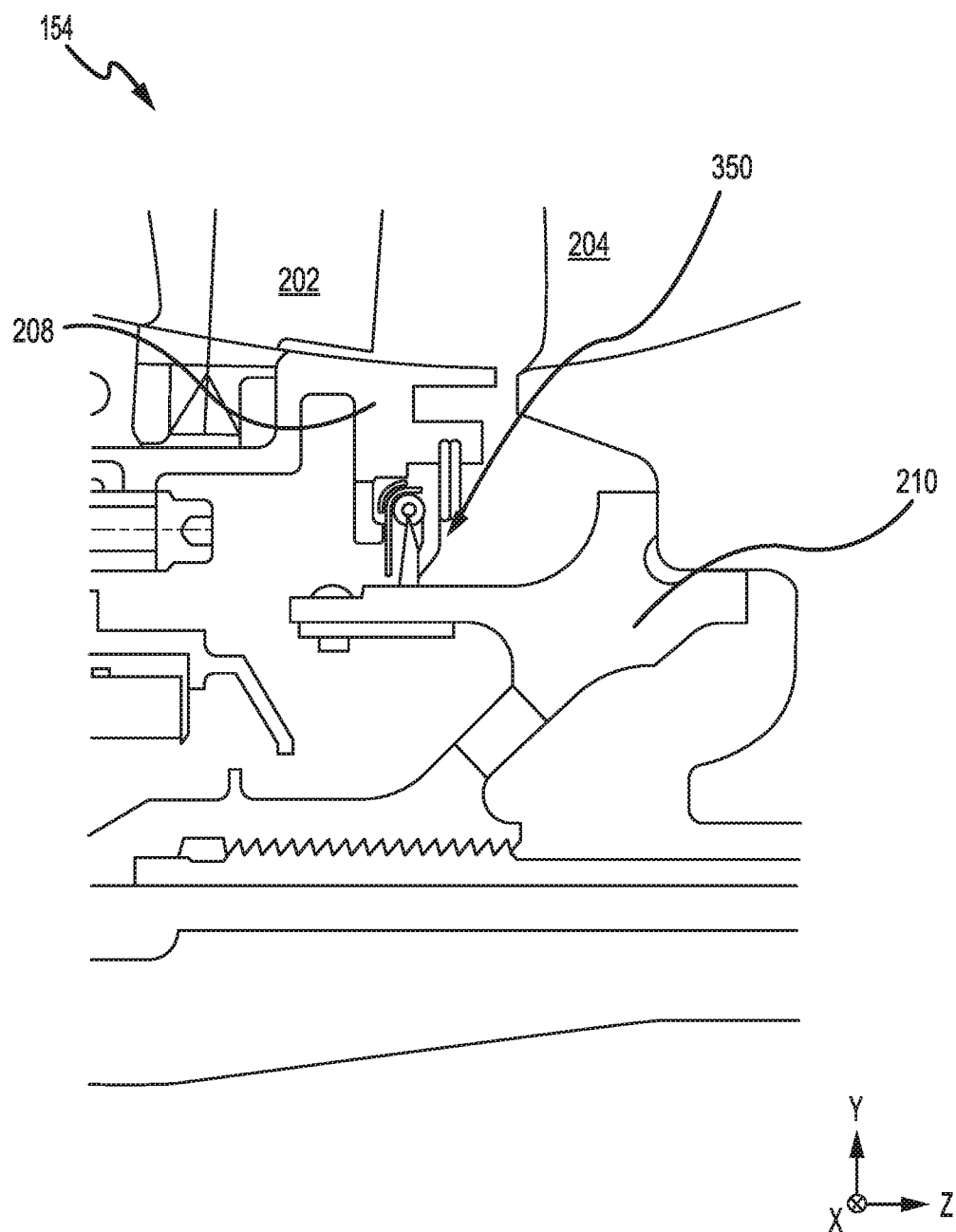
FIG. 2 illustrates a schematic cross-section of a portion of a high pressure turbine section of the gas turbine engine of FIG. 1, in accordance with various embodiments.

With reference to FIG. 2, a portion of high pressure turbine 154 is illustrated, in accordance with various embodiments. High pressure turbine 154 may include a non-rotating member (e.g., vane 202), and a rotating member (e.g., blade 204). Blade 204 may be configured to rotate about engine central longitudinal axis A-A', in response to receiving a flow of fluid (e.g., air) from combustor section 126 (FIG. 1). Power from the flow may be converted to mechanical power, or torque, by blade 204. Vane 202 may be coupled to a frame, casing, or other support structure (e.g., static structure 208) of high pressure turbine 154. Vane 202 may help direct the flow of fluid forward of blade 204. Vane 202 may comprise a static structure that does not rotate relative to engine central longitudinal axis A-A'.

In various embodiments, vane 202 may include the static structure 208 disposed radially inward from the non-rotating member or vane 202. Similarly, blade 204 may be coupled to a shaft 210 configured to rotate about center longitudinal axis A-A'. In various embodiments, a brush seal 350 may be disposed between the static structure 208 and the shaft 210.

Figure 3:
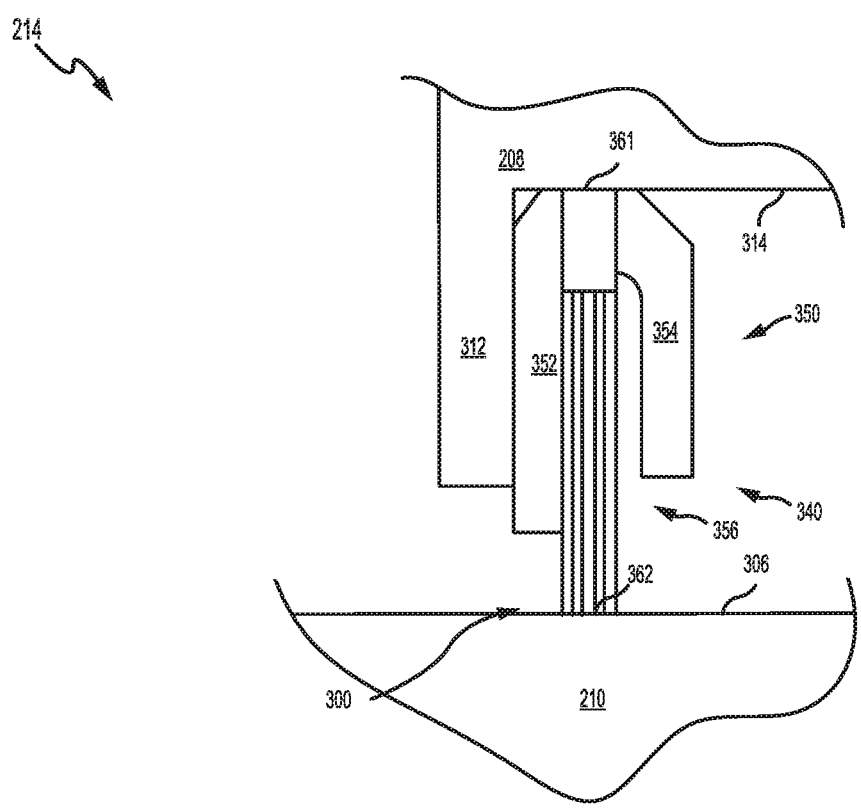
FIG. 3 illustrates a seal system with the seal cavity, in accordance with various embodiments.

With reference to FIG. 3, a seal system 214 comprising a brush seal 350 is illustrated, in accordance with various embodiments. In various embodiments, brush seal 350 may be an annular split ring seal centered about axis of rotation A-A' (FIG. 2). Brush seal 350 may be configured to seal an airflow over shaft 210 (e.g., core flowpath C of FIG. 1) from an airflow on the opposite or axially forward of brush seal 350.

Brush seal 350 may comprise a bristle pack 356. In various embodiments, each bristle in the bristle pack 356 may comprise a shape memory alloy, such as a nickel titanium alloy, or the like. In various embodiments, a portion of the bristles in the bristle pack 356 may comprise a shape memory alloy. The bristle pack 356 may contact first radial surface 306 of vane 202. In various embodiments, bristle pack 356 may comprise bristles of varying diameter and/or bristles that lay at varying angles relative to axis of rotation A-A' (FIG. 1). Upon assembly, bristle pack 356 may have an interference fit with first radial surface 306 of vane 202. The heat generation caused by the interference fit may cause the bristle pack 356 to curl. Each bristle in bristle pack 356 may comprise a sealing end 362 disposed proximate first radial surface 306.

Figure 4:
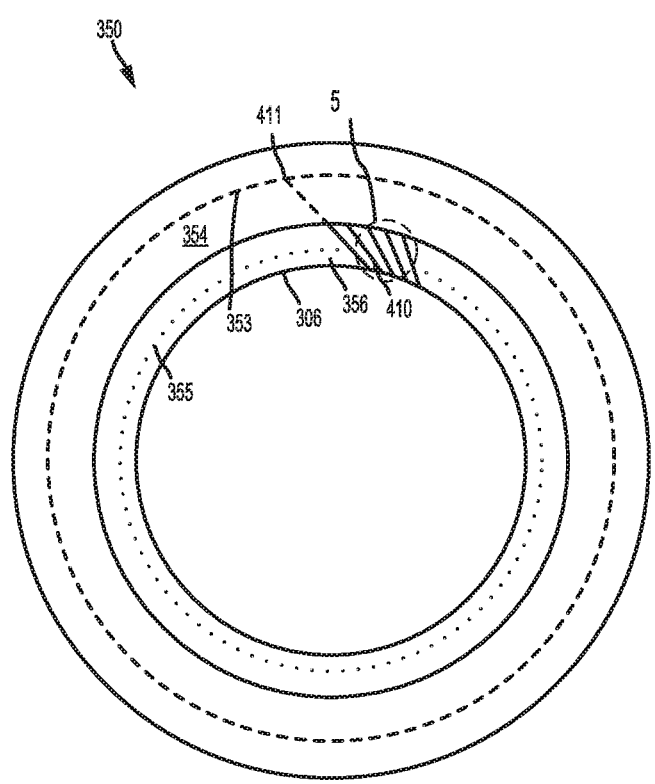
FIG. 4 illustrates a seal system with the seal cavity during operation, in accordance with various embodiments.

Referring now to FIG. 4, a front view of a portion of seal system 214 is illustrated, in accordance with various embodiments. In various embodiments, the bristle pack 356 may be manufactured to extend from a radially outer end 353 of bristle pack 356 in an axial plane at an angle substantially 45 degrees to a tangent to an interface point 411 at radially outer end 353 of bristle pack 356. Each sealing end of each bristle in bristle pack 356 may include an interference fit to first radial surface 306 upon installation of the brush seal 350. Similarly, during operation of the gas-turbine engine, when rotor speeds are low (e.g., 2,000 to 4,000 revolutions per minute), a temperature gradient across the bristle pack from a distal end to sealing end may be relatively uniform and/or low in temperature. In contrast, as the rotor speeds increase, the bristle pack 356 may begin to heat up and a temperature gradient may begin to form from distal end 361 to sealing end 362 and/or each bristle in bristle pack 356 may begin to curl away from first radial surface 306 as the phase transformation temperature is reached.

Referring back to FIG. 3, brush seal 350 may further include a backing plate 352. Backing plate 352 may be coupled to bristle pack 356. Backing plate 352 may be disposed axially adjacent of bristle pack 356. Backing plate 352 may be made from a metal or metal alloy. For example, backing plate may comprise aluminum, copper, nickel, cobalt, titanium, steel, and/or alloys thereof.

Brush seal 350 may further include a retention structure 354 disposed axially adjacent of bristle pack 356 and opposite of backing plate 352. In various embodiments, retention structure 354, bristle pack 356, and backing plate 352 may be welded together. In various embodiments, retention structure 354, bristle pack 356, and backing plate 352 may be welded or joined at end of brush seal 350 that is distal to the sealing interface. Stated differently, the weld joining retention structure 354, bristle pack 356, and backing plate 352 may be located generally opposite the ends of bristle pack 356 that form the sealing interface (i.e., contact) along first radial surface 306. Electron-beam (e-beam) welding may be used to form the joint or weld between backing plate 352, bristle pack 356, and retention structure 354. E-beam welding is done by applying a beam of high-velocity electrons to materials to be joined. The materials melt and flow together as the kinetic energy of the high velocity electrons are transformed into heat upon impact. The weld may be formed continuously around brush seal 350.

Brush seal 350 may be disposed in a seal cavity 340. Seal cavity 340 may be defined, at least partially, by static structure 208 and shaft 210. For example, shaft 210 may comprise a first radial surface 306, and static structure 208 may comprise a second radial surface 314. The first radial surface 306 may be disposed radially inward of second radial surface 314. Static 208 may further comprise a flange 312 extending axially from second radial surface 314 towards first radial surface 306. The flange 312 may act as a seal support for brush seal 350. In various embodiments, brush seal 350 may be configured to create a seal between static structure 208 and shaft 210 in seal cavity 300.

Figure 5A:
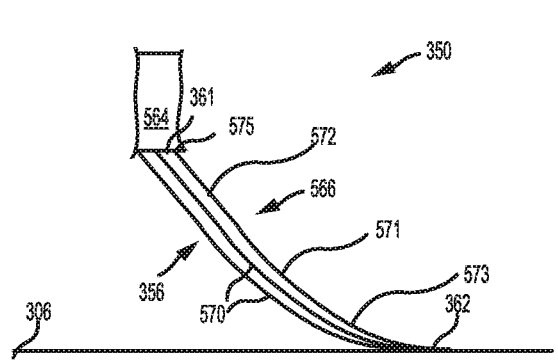
FIG. 5A illustrates a brush seal, in accordance with various embodiments.
Figure 5B:
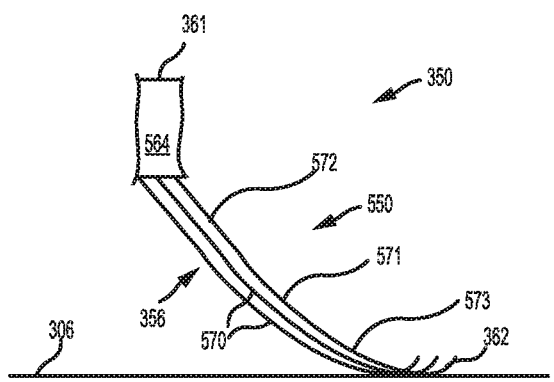
FIG. 5B illustrates a brush seal, in accordance with various embodiments.

Referring now to FIGS. 3, 5A and 5B, a portion of brush seal 350 before and during operation of a gas-turbine engine, are illustrated, in accordance with various embodiments. In various embodiments, airflow may be generated from a rotor blade (e.g., rotating blade or member 200 from FIG. 2). As the angular velocity of rotating blade or member 200 increases, a temperature proximate first radial surface 306 of vane 202 begins to increase. As the temperature increases, a temperature gradient occurs in bristle pack 356 from distal end 361 to sealing end 362. In various embodiments, the temperature gradient may comprise a cool end (e.g., distal end 361) and a hot end (e.g., sealing end 362). In various embodiments, the cool end and the hot end are relative to each other (i.e., hot end may be between 1° C. and 50° C. warmer than cool end, or hot end may be between 3° C. and 25° C. warmer than cool end, or hot end between 3° C. and 10° C. warmer than cool end).

As the bristle pack 356 begins to increase in temperature, each bristle in bristle pack 356 may begin to deform due to a phase transformation from martensite to austenite. Each bristle in bristle pack 356 may be configured to deform by curling at sealing end 362 in a direction radially outward and away from first radial surface 306. By each bristle in bristle pack 356 curling radially outward and away from first radial surface 306, the sealing end 362 of bristle pack 356 may experience reduced wear rate due to the reduced contact. In various embodiments, the bristle pack 356 is configured to create a passive clearance control during operation of a gas-turbine engine. The amount of bristle curl may be designed to counter act some or all of the downward movement of the bristle caused by the blow down force from the pressure differential across brush seal 350.

In various embodiments, the bristle pack 356 comprises a non-shape memory alloy portion 564 and a shape memory alloy portion 566. The non-shape memory alloy portion 564 may be any non-shape memory alloy known in the art, such as a nickel alloy, a titanium alloy, an aluminum alloy, or the like. The non-shape memory alloy portion 564 may be coupled to retention structure 354 and backing plate 352 by any method known in the art, such as welding, brazing, or the like. The shape memory alloy portion 566 may extend away from non-shape memory alloy portion 564. The shape memory alloy portion 566 may curve away from backing plate 352 and towards retention structure 354.

In various embodiments, the shape memory alloy portion 566 may comprise a plurality of bristles 570. The non-shape memory alloy portion 564 may be monolithic. The plurality of bristles 570 from the shape memory alloy portion 566 may be coupled to the non-shape memory alloy portion 564 by any method known in the art, such as welding or the like. Each bristle in the plurality of bristles 570 may be shape set to have a freeform shape extending radially inward in an axial plane from non-shape memory alloy portion 564 at a substantially 45 degree angle from a joint. Each bristle in the plurality of bristles 570 may be configured to curl at sealing end 362 away from a first radial surface 306 (i.e., a sealing surface) as a temperature of each bristle increases.

In various embodiments, each bristle in the plurality of bristles 570 may have a manufactured shape. A "manufactured shape," as disclosed herein is a shape of each bristle while it is not in use (e.g., when each bristle is at room temperature). For example, first bristle 571 has a manufactured shape comprising a line portion 572 and an arc portion 573. Line portion 572 may extend radially inward in an axial plane from non-shape memory alloy portion 564 at a substantially 45 degree angle from a tangency of a joint 575 of the non-shape memory alloy portion 564 and the first bristle 571. Arc portion 573 may curve away from a first radial surface 306 during operation.

The parent shape is the austenitic shape that each bristle in the plurality of bristles 570 are initially set to and then rapidly cooled. A "parent shape," as disclosed herein is a shape that that each bristle in the plurality of bristles 570 is configured to transform to during operation. From there, each bristle in the plurality of bristles 570 may be manipulated into a new shape that results in interference with a radial surface at build, this is the manufactured shape. As each bristle in the plurality of bristles 570 heat up in operation due to interference with the first radial surface 306 (e.g., a sealing surface), it will reach the phase transformation temperature where it will transform into austenite and deform from its manufactured shape into its parent shape (e.g., a curled away configuration).

Figure 6:
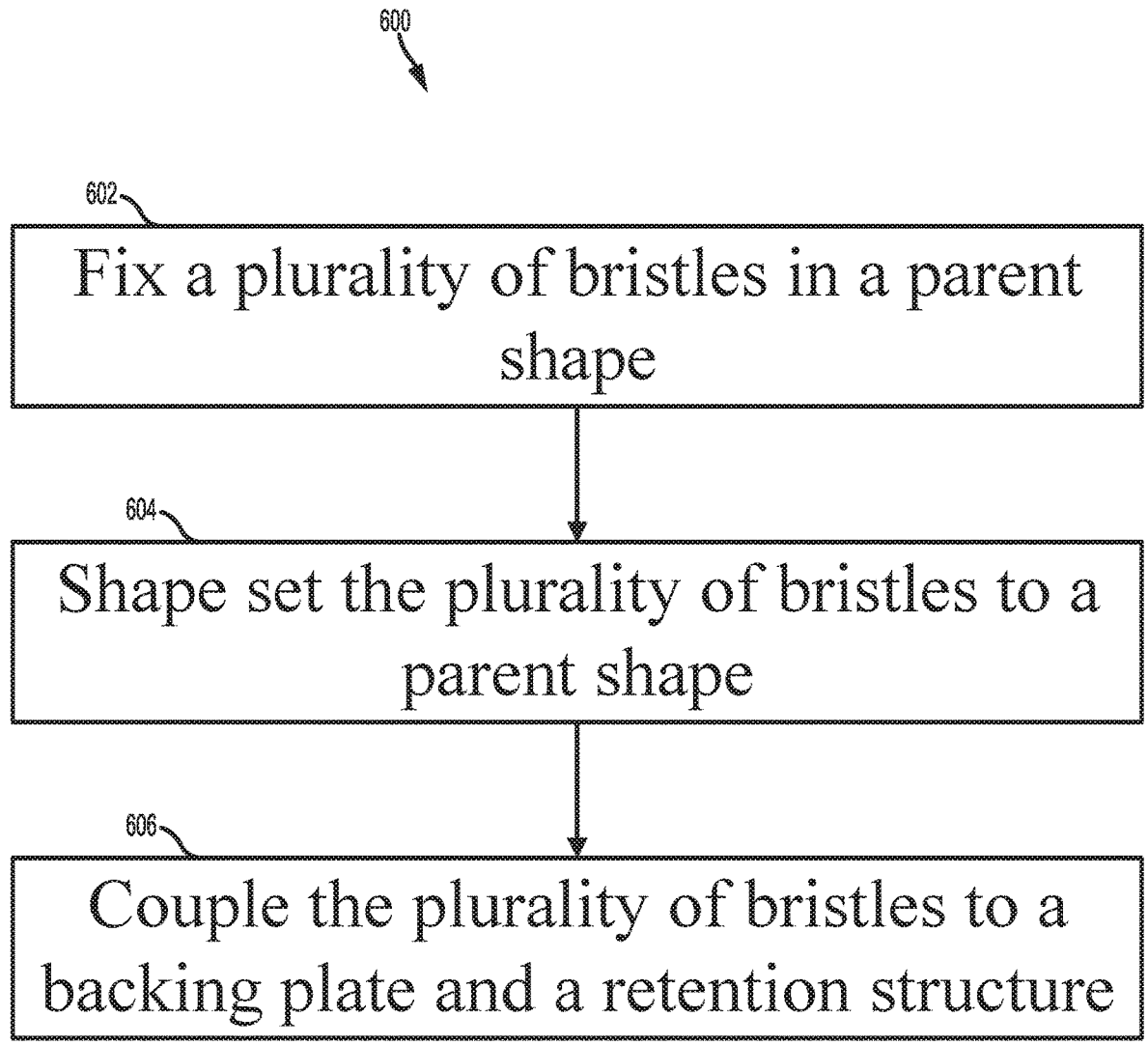
FIG. 6 illustrates a method of manufacturing a brush seal, in accordance with various embodiments.

Referring now to FIG. 6, a method 600 of manufacturing a brush seal, in accordance with various embodiments, is illustrated. The method 600 comprises fixing a plurality of bristles in a parent shape (step 602). In various embodiments, the parent shape of each bristle may comprise a line portion and an arc portion. The arc portion may include a curled portion. The method 600 may further comprise shape setting the plurality of bristles into the parent shape (step 604). For example, the shape setting may comprise heating the plurality of bristles to a temperature greater than 400° C. In various embodiments, the temperature for shape setting may be between 475° C. and 525° C. In various embodiments, the shape setting may further comprise rapid cooling the plurality of bristles. The rapid cooling may be performed via water quench, rapid air cool, or the like.

The method 600 may further comprise coupling the plurality of bristles to a backing plate and a retention structure (step 606). The plurality of bristles may be coupled to the backing plate and the retention structure by welding, brazing, or the like. In various embodiments, the plurality of bristles may be coupled to a non-shape memory alloy portion of a bristle pack. The non-shape memory alloy portion may in turn be coupled to the backing plate and the retention structure.

Figure 7:
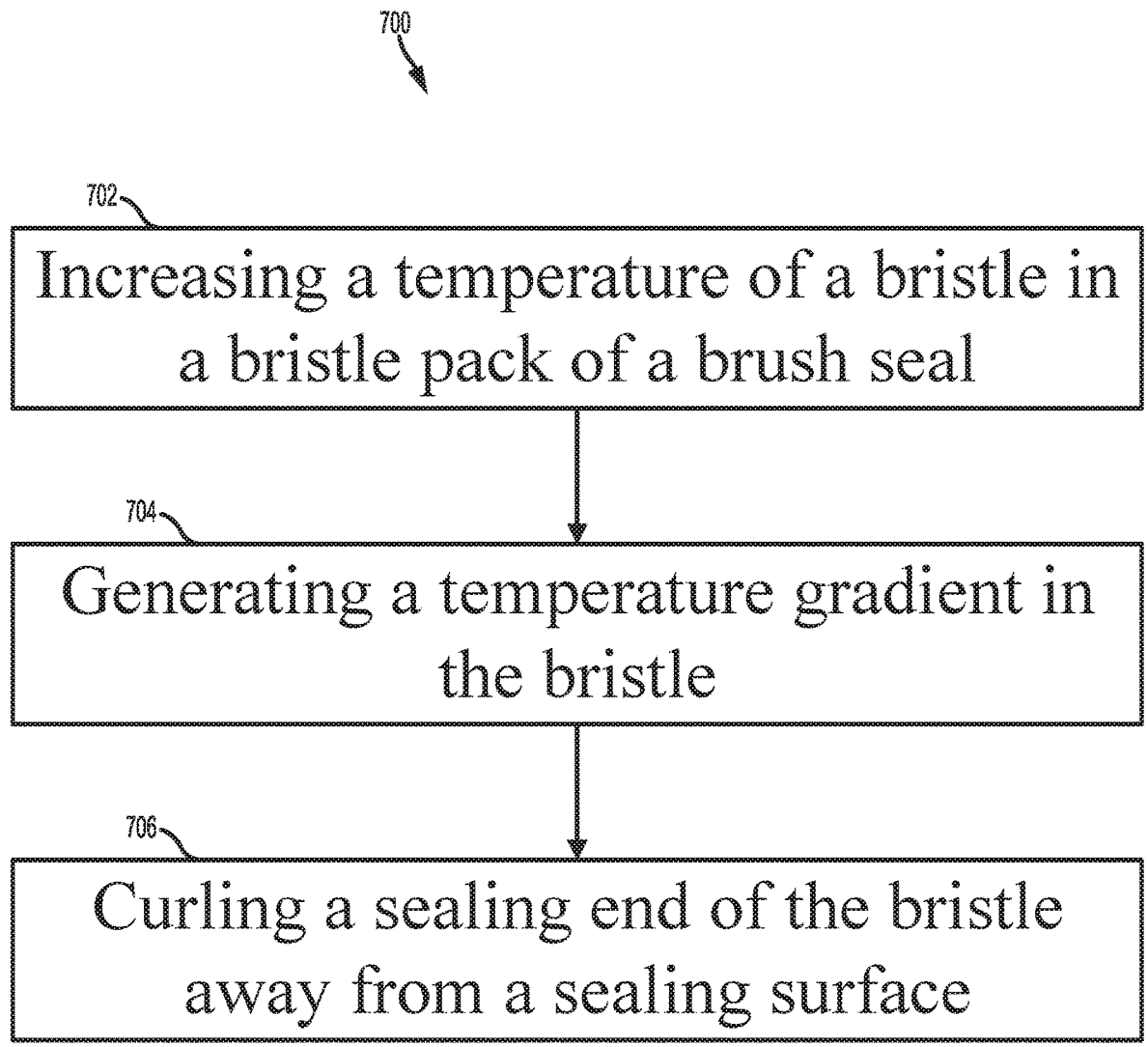
FIG. 7 illustrates a method of using a brush seal, in accordance with various embodiments.

Referring now to FIG. 7, a method 700 of using a brush seal, in accordance with various embodiments, is illustrated. The method 700 may comprise increasing a temperature of a bristle in a bristle pack of a brush seal (step 702). In various embodiments, the increase in the temperature of the bristle may occur from operation of a gas-turbine engine. For example, a rotor may be disposed proximate the brush seal, and as the rotor increases in speed, the temperature proximate the brush seal may increase, resulting in an increase in temperature of the bristle in the bristle pack.

The method 700 may further comprise generating a temperature gradient in the bristle (step 704). The bristle may comprise a sealing end and a distal end. The sealing end may be proximate to an area that may be exposed to the increase in temperature during operation of the gas-turbine engine. The distal end may be disposed distal to the area exposed to the increase in temperature. The temperature at distal end may be relatively cool compared to the temperature at sealing end creating a temperature gradient from distal end to sealing end.

The method 700 may further comprise curling the sealing end of the bristle away from a sealing surface (step 706). In response to the sealing end increasing in temperature, the bristle may be configured to curl the sealing end away from a sealing surface. The sealing end may still contact the sealing surface, but the contact may be reduced in response to the curling. The bristle may experience reduced wear rates compared to typical bristles due to the reduced contact. The bristle may create a passive clearance control with the sealing surface.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brush seal, comprising:
   a backing plate;
   a retention structure; and
   a bristle pack disposed between the backing plate and the retention structure, the bristle pack comprising a bristle including a shape memory alloy, wherein:
      the bristle comprises a manufactured shape including a line and an arc,
      the line extends radially inward and defines an axial plane,
      the line extends substantially 45 degrees to a tangency at a joint between the bristle and a non-shape memory alloy portion.

2. A brush seal of claim 1, wherein the bristle comprising a manufactured shape including a line and an arc.

3. The brush seal of claim 1, wherein the bristle pack further comprises the non-shape memory alloy portion coupled to the retention structure and the backing plate.

4. The brush seal of claim 1, wherein the arc is configured to interface with a radial sealing surface.

5. The brush seal of claim 1, wherein the bristle is configured to curl away from a radial sealing surface at a phase transformation temperature in response to an increase in temperature, and wherein the bristle is configured to compliment a force balance of a blow down force.

6. The brush seal of claim 5, wherein the bristle is configured to curl away from the radial sealing surface.

7. The brush seal of claim 1, wherein the bristle is configured for passive clearance control.

8. The brush seal of claim 1, wherein the bristle pack comprises a plurality of the bristle.

9. A seal system, comprising:
   a seal cavity defined, at least partially, by a first radial surface and a second radial surface; and
   a brush seal disposed in the seal cavity, the brush seal comprising:
      a backing plate;
      a retention structure; and
      a bristle pack disposed between the backing plate and the retention structure, the bristle pack comprising a bristle including a shape memory alloy, wherein:
         the bristle comprises a sealing end disposed proximate the first radial surface,
         the sealing end is configured to curl away from the first radial surface when the bristle increases in temperature, and
         the bristle extends radially inward and defines an axial plane.

10. The seal system of claim 9, wherein the bristle is configured to form an interference fit with the first radial surface, the first radial surface including a sealing surface upon installation of the brush seal.

11. The seal system of claim 9, wherein the seal cavity is disposed in a gas-turbine engine, and wherein the bristle pack is configured for passive clearance control during operation of the gas-turbine engine.

12. The seal system of claim 9, wherein the bristle comprising a manufactured shape including a line and an arc.

13. The seal system of claim 12, wherein the arc contacts the first radial surface.

14. The seal system of claim 9, wherein a sealing end of the bristle is configured to curl away from the first radial surface.

15. A method of manufacturing a brush seal, the method comprising:
   fixing a plurality of bristles in a parent shape, each bristle in the plurality of bristles comprising a shape memory alloy;
   setting the parent shape of the shape memory alloy, the parent shape including a line and an arc, the line extending in a radially inward direction and defining an axial plane; and
   coupling the plurality of bristles to a backing plate and a retention structure, wherein coupling the plurality of bristles further comprises orienting the arc away from the backing plate in the axial plane, the line extends substantially 45 degrees to a tangency at a joint between the bristle and a non-shape memory alloy portion.

16. The method of claim 15, wherein setting the parent shape comprises heating the shape memory alloy to a temperature greater than 400° C.

17. The method of claim 16, wherein setting the parent shape further comprises rapid cooling the shape memory alloy after heating the shape memory alloy.

* * * * *